US011326742B2

(12) United States Patent
Yanagida et al.

(10) Patent No.: US 11,326,742 B2
(45) Date of Patent: May 10, 2022

(54) VALVE

(71) Applicant: Fujikin Incorporated, Osaka (JP)

(72) Inventors: Yasumasa Yanagida, Osaka (JP); Koji Hiramatsu, Osaka (JP); Tadayuki Yakushijin, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 88 days.

(21) Appl. No.: 16/635,138

(22) PCT Filed: Feb. 7, 2018

(86) PCT No.: PCT/JP2018/028356
§ 371 (c)(1),
(2) Date: Jan. 29, 2020

(87) PCT Pub. No.: WO2019/026814
PCT Pub. Date: Feb. 7, 2019

(65) Prior Publication Data
US 2021/0088186 A1    Mar. 25, 2021

(30) Foreign Application Priority Data

Jul. 31, 2017  (JP) .............................. JP2017-148634

(51) Int. Cl.
*F16K 1/42*    (2006.01)
*F17C 13/04*   (2006.01)
(Continued)

(52) U.S. Cl.
CPC .............. *F17C 13/04* (2013.01); *F16K 1/422* (2013.01); *F16K 27/02* (2013.01); *F16K 27/08* (2013.01);
(Continued)

(58) Field of Classification Search
CPC .......... F16K 1/302; F16K 1/422; F16K 1/427; F16K 1/224
See application file for complete search history.

(56) References Cited

U.S. PATENT DOCUMENTS

| 2,507,851 | A | * | 5/1950 | Bryant | ...................... F16K 1/06 |
| | | | | | 251/142 |
| 2,715,415 | A |   | 8/1955 | Nuckolls | |
| 2,845,085 | A | * | 7/1958 | Robbins | .................... F16K 1/42 |
| | | | | | 137/454.6 |

FOREIGN PATENT DOCUMENTS

| CN | 201258991 Y | 6/2009 |
| JP | 42-21894    | 12/1967 |
| (Continued) | | |

*Primary Examiner* — Reinaldo Sanchez-Medina
*Assistant Examiner* — Nicole Gardner
(74) *Attorney, Agent, or Firm* — Cislo & Thomas, LLP

(57) ABSTRACT

Provided is a valve for high-pressure gas, wherein a sheet member is provided inside a through hole formed in a valve body of the valve, wherein the sheet member constitutes a channel for high-pressure gas inside the through hole, wherein the sheet member is fixed inside the through hole by a pressing member, wherein an end opening of the through hole is closed by a lid member, wherein a gasket is provided at a peripheral part of the end opening of the through hole, wherein the gasket is sandwiched between the lid member and the valve body, wherein the lid member is pressed toward the valve body by a plug, and wherein a bearing is provided between the plug and the lid member.

4 Claims, 2 Drawing Sheets

(51) Int. Cl.
*F16K 27/02* (2006.01)
*F16K 27/08* (2006.01)
*F16K 1/30* (2006.01)

(52) U.S. Cl.
CPC .............. *F16K 1/302* (2013.01); *F16K 1/427* (2013.01); *F17C 2205/0388* (2013.01); *F17C 2221/012* (2013.01); *F17C 2270/0184* (2013.01)

(56) References Cited

FOREIGN PATENT DOCUMENTS

| | | |
|---|---:|---:|
| JP | 43-13903 | 6/1968 |
| JP | S57-19704 | 8/1983 |
| JP | 58-193985 | 11/1983 |
| JP | 1983193985 A | 11/1983 |
| JP | S57-85293 | 12/1983 |
| JP | S59-81724 | 12/1985 |
| JP | H2-83414 | 4/1992 |
| JP | 2008-223368 | 9/2008 |
| JP | 2008223368 A | 9/2008 |
| WO | WO2017022838 | 2/2017 |
| WO | WO2019026814 | 2/2019 |

\* cited by examiner

VALVE

BACKGROUND

The present invention relates to a control valve for fluid, and more particularly, to a valve suitably used as an opening and closing valve which controls high pressure fluid.

A valve is an apparatus provided at a channel such as piping, and having a movable mechanism (valve body) which can open and close the channel in order to pass, stop, or control the fluid.

When the valve body is raised and the channel opens, fluid flows to downstream from upstream, and when the valve body is lowered and the channel closes, a flow of fluid is stopped.

In addition, there is also a valve which can adjust a flow by slightly raising and lowering the valve body, and narrowing the channel.

The channel comprises a first channel connected to an upstream side, a second channel connected to a downstream side, and a through hole which connects the first channel and the second channel and is provided in a valve body as a path where a stem moves.

Fluid might leak depending on pressure of fluid while it passes through the channel. Therefore, measures for preventing a leakage have been taken.

For example, as indicated in WO 2017/022838, for a valve configured to insert a sheet member forming a channel into a valve body, a sealing was made so that fluid might not leak outside by for example attaching a rubber member directly to a valve drive member, or attaching a packing such as an O ring to an outside surface of a sheet member and an opposed surface against an inner surface of a through hole of a valve body.

However, for a conventional valve using the O ring as mentioned above, the O ring provided between the outside surface of the sheet member and the opposed surface against the inner surface of the through hole of the valve body is worn out due to friction with a stem, or is deformed by pressure from the stem or the valve body, etc. Normally, additional pressure of fluid causes the deformed O ring to be more deformed, but if the fluid pressure is not high, the distortion of the O ring is also small and thus the valve can still function as a sealing without leaking fluid. However, if the fluid pressure is high, the O ring receives the increased pressure and is more distorted. Further, since the O ring is formed with a rubber or a plastic material, there is no particular problem if the fluid temperature is at about room temperature. However, in particular, when a low-temperature fluid flows, the O ring will be contracted. A gap created by the contraction sometimes led a leakage of fluid out of the channel. Furthermore, there was a problem that a low-temperature and high-pressure fluid with a small number of molecules, like hydrogen, leaked out of a channel through an O ring made by plastics.

The conventional valve is configured to integrate a pressing member, a lid member, and a plug all together, and to have two O rings in the through hole.

When the O ring of this conventional valve is replaced with a metal seal, two metal seals shall be pressed by one member.

Since a metal seal is not deformed, one metal seal is fully pressed, but another metal seal is not completely pressed, leading to reduction of the pressing force.

The valve body is sealed with the sheet member to prevent leakage, but the valve body is not sealed with the pressing member or a seal member, allowing leakage of fluid.

Therefore, in addition to the pressing member, a gasket for sealing has been needed to prevent gas from leaking outside.

SUMMARY

The present invention aims to solve the problem mentioned above. A valve is configured to comprise: a pressing member, a lid member, and a plug as separate components; wherein the sheet member is fixed at the valve chest inside the valve body by the pressing member, wherein an end opening of the through hole is closed by the lid member, wherein the gasket is sandwiched between the end opening of the through hole and the lid member, wherein the lid member is fixed by a plug pressing the lid member toward the valve body.

The invention according to first aspect relates to a valve comprising: a valve body having a fluid inlet and a fluid outlet; and a valve chest in the valve body in communication with the fluid inlet and the fluid outlet, said valve having a sheet member, the sheet member being fixed to the valve chest and having a seat; wherein the valve body has a through hole in communication with the valve chest, wherein the sheet member is inserted through the through hole into the valve chest, wherein said sheet member is fixed to the valve chest inside the valve body by a pressing member, wherein an end opening of the through hole is closed by a lid component, wherein a gasket is sandwiched between the end opening and the lid component, and wherein the lid member is fixed by a plug pressing the lid member toward the valve body.

The invention according to second aspect relates to the valve of the first aspect, wherein the gasket is a metal seal.

The invention according to third aspect relates to the valve of the first aspect, wherein the sliding member is provided between the lid member and the plug.

The invention according to fourth aspect relates to the valve of the third aspect, the sliding member is a bearing or a thrust ring.

According to the invention relating to the first aspect, the sheet member is directly fixed to the valve chest in the valve body by the pressing member to allow prevention of leakage from the valve seat during closing the valve. The gasket is sandwiched by the lid member and the valve body, which is pressed toward the valve body by the plug to allow prevention of distortion of the gasket, and thereby leakage to the outside. The sheet member of the valve is easy to be replaced. When the sheet member is replaced, screws of the plug are loosened and removed, and then the lid member, the gasket, and the pressing member are removed to finish removal of the sheet member.

According to the invention relating to the second aspect, the gasket is a metal seal, and thus the gasket is hardly distorted due to a friction or pressure of a gas, unlike the conventional O ring, and the valve can maintain long-term airtightness without being affected externally.

According to the invention relating to the third and the fourth aspects, the sliding member is provided between the lid member and the plug in order to transfer, not the rotational force of the plug, but the pressure by the plug to the lid member when it is fixed to the valve body and then rotated. With the rotational force being not applied to the lid member, the gasket in contact with the lid member does not receive the rotational force but the pressure from the lid member only, and thus is not distorted.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

A valve according to embodiments of the present invention is described below with reference to accompanying drawings.

Figure 1:
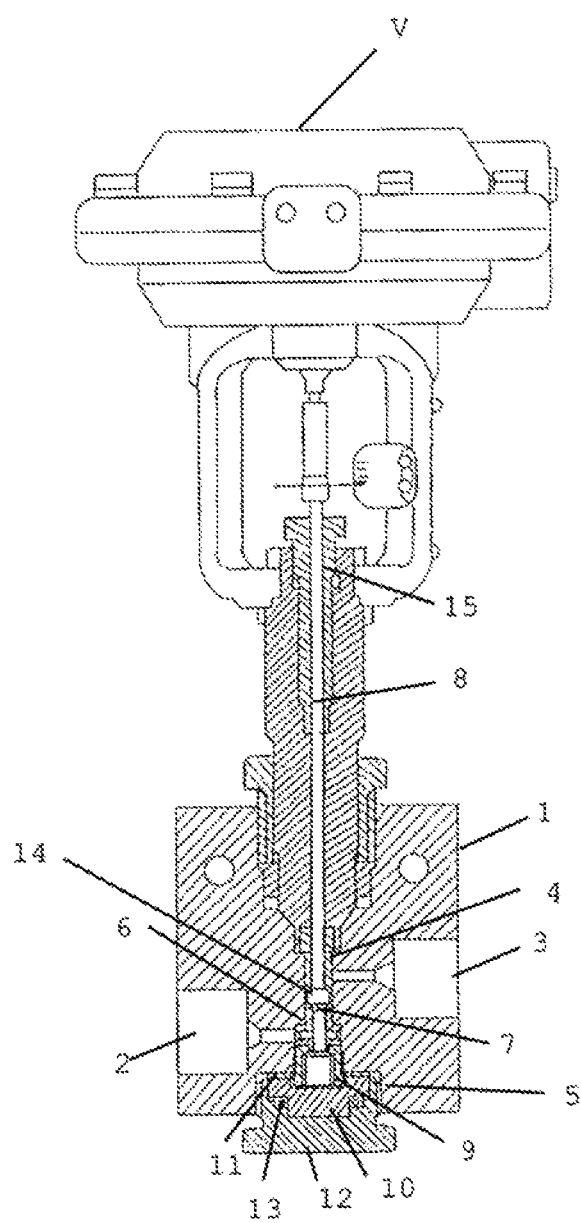
FIG. 1 is a partial sectional view of a valve according to the present invention.

FIG. 1 is a partial cross-sectional view of a valve (V).

A valve body (1) comprises a fluid inlet (2), a fluid outlet (3), a valve chest (4), and a through hole (5) as shown in FIG. 1.

Each fluid inlet (2), fluid outlet (3), valve chest (4), and through hole (5) are in fluid connection each other. Fluid flows from the fluid inlet (2) through the sheet member (6) inserted into the through hole (5) to a seat (7). It enters the valve chest (4) and exits the fluid outlet (3).

A stem (8) slides up and down in the valve chest (4) to open and close a channel, and control the fluid.

Figure 2:
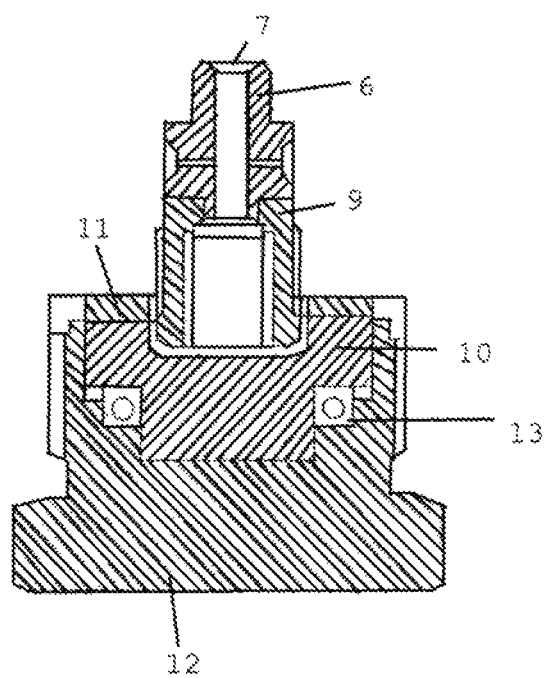
FIG. 2 is an enlarged view of an end opening of a through hole of FIG. 1 and shows one embodiment of the present invention.

The through hole in the valve body (1) comprises the seat (7), the sheet member (6), a pressing member (9) to fix the sheet member (6) inside the through hole (5), a lid member (10) provided at an end opening of the through hole (5), a gasket (11) provided at a peripheral part of the end opening of the through hole (5), and a plug (12) to press the lid member (10) toward the valve body (1), as shown in FIG. 2.

The valve (V) of the present invention may include a sliding member (13) between the plug (12) and the lid member (10) as shown in FIG. 2.

A valve according to the present invention is a valve for high-pressure gas.

A valve according to the present invention can be used for high-pressure fluid, such as hydrogen.

"High pressure" refers to pressure by fluid at one MPa (mega Pascal) or more.

In recent years, there has been a need for a valve for high-pressure fluid at more than 50 MPa (mega Pascal) thanks to development of fuel cell technology etc.

The valve body (1) of the valve (V) according to the present invention comprises a fluid inlet (2), a fluid outlet (3), a valve chest (4), and a through hole (5).

Each fluid inlet (2), fluid outlet (3), valve chest (4), and through hole (5) are connected. Fluid flows from the fluid inlet (2) through a sheet member (6) inserted into the through hole (5) to a seat (7). It enters the valve chest (4) and exits the fluid outlet (3).

As a stem (8) slides up and down inside the valve chest (4), and a valve element (14) formed at an end of the stem contacts and discontacts the seat (7). This movement enables opening and closing of a channel, and controlling of fluid.

An actuator (15) is provided in an upper part of the stem (8) in order to slide the stem (8) up and down.

The actuator (15) may be either automatic or manual. The automatic actuator may be driven by an electromagnet, a motor, and air pressure, etc.

The sheet member (6) is inserted into the through hole (5) provided in the valve body (1).

The sheet member (6) constitutes a channel to communicate a hole provided in the seat (7) with the fluid inlet (2) when the channel is closed.

The sheet member (6) is required to have long-term airtightness, wear resistant, thermal conduction, and strength and may be made either by typical carbon or metal.

The sheet member (6) is fixed inside the through hole (5) by the pressing member (9).

The sheet member (6) may have a step provided at a boundary between the valve chest (4) and the through hole (5) and it may be inserted into the step.

As a method for fixing the pressing member (9), the through hole may be threaded and the sheet member (6) may be screwed in the threaded part.

The pressing member (9) may include, but not limited to, a typically-used material such as metal.

Leakage does not happen at the valve chest (4) when a valve is closed, since the sheet member (6) tightly comes into contact with the valve body (1) by the pressing member (9).

A hole may be provided in the center of the pressing member (9).

It enables fluid leaked from the threaded part of the pressing member (9) to flow through the hole to an original channel.

An end opening of the through hole (5) is closed by the lid member (10).

The lid member (10) may include, but not limited to, a typically used material such as metal.

The lid member (10) is tightly connected to the end opening of the through hole (5), but it is not needed to be connected to the pressing member (9).

A gasket (11) is provided at a peripheral part of the end opening of the through hole (5) to improve airtightness.

The gasket (11) may include, but not limited to, a typically used material such as a metal seal since it is expected to maintain airtightness without be affected externally.

The gasket is sandwiched between the lid member (10) and the valve body (1).

The lid member (10) is pressed toward the valve body (1) by the plug (12).

As a method for fixing the plug (12) to the valve body (1), for example, the valve body may be threaded and the plug (12) may be screwed in the threaded part of the valve body.

A sliding member (13) is provided between the plug (12) and the lid member (10).

When the sliding member (13) is provided, a rotational torque decreases and a rotational force is not applied to the gasket (11), resulting in less distortion.

The sliding member (13) may include, but not limited to, a bearing and a thrust ring.

For a valve (V) of the present invention, the sheet members (6), the pressing member (9), the lid member (10), and the plug (12) comprise separate materials, respectively, and thus stem replacement can be easy.

A method for fixing by threading will be set forth but is not limited to the followings.

When a stem is replaced, firstly, the plug (12) is rotated in the direction opposite to a rotational direction for attachment so that it can be removed from the valve body (1).

Secondly, the lid member (10) is removed, and then the pressing member (9) is removed from the through hole (5).

The pressing member (9) can be easily removed by rotating it in a direction opposite to the direction for attachment.

Finally, the sheet member (6) is removed, and then the stem (8) is removed to be replaced with new stem.

After replacing the stem, the sheet member, the pressing member, the lid member, and the plug are attached in this order to complete the replacement.

INDUSTRIAL APPLICABILITY

Unlike a conventional valve, a valve of the present invention includes a gasket which is not deformed by fluid pressure and has long-term airtightness without being affected externally.

Inside the through hole formed in the valve body of the valve, provided is the sheet member; wherein the sheet member constitutes a channel for high-pressure gas inside the through hole and is fixed inside the through hole by the pressing member; wherein the end opening of the through hole is covered by a lid member; wherein a gasket is provided at a peripheral part of the end opening of the through hole and is sandwiched between the lid member and the valve body; wherein the lid member is pressed toward the valve body by the plug, such configuration can provide a valve with easy stem-replacement and easy maintenance.

EXPLANATION OF SYMBOLS

1 Valve Body
2 Fluid Inlet
3 Fluid Outlet
4 Valve Chest
5 Through Hole
6 Sheet Member
7 Seat
8 Stem
9 Pressing Member
10 Lid Member
11 Gasket
12 Plug
13 Sliding Member
14 Valve Element
15 Actuator
V Valve

What is claimed is:

1. A valve, comprising:
   a valve body having a fluid inlet and a fluid outlet; and
   a valve chest in said valve body in communication with said fluid inlet and said fluid outlet, said valve having a sheet member, said sheet member being fixed to said valve chest and having a seat,
   wherein said valve body has a through hole in communication with said valve chest,
   wherein said sheet member is inserted through said through hole into said valve chest,
   wherein said sheet member is fixed to said valve chest inside said valve body by a pressing member,
   wherein an end opening of said through hole is closed by a lid member,
   wherein a gasket is sandwiched between said end opening and said lid member,
   wherein said lid member is fixed by a plug pressing said lid member toward said valve body,
   wherein said gasket is a metal seal, and
   wherein a sliding member is provided between said lid member and said plug.

2. The valve according to claim 1, wherein said sliding member is a bearing or a thrust ring.

3. The valve according to claim 1, wherein the plug surrounds said lid member.

4. The valve according to claim 1, wherein the sliding member directly contacts the plug and lid member and is configured to receive a rotational torque from the plug.

* * * * *

UNITED STATES PATENT AND TRADEMARK OFFICE
CERTIFICATE OF CORRECTION

| | |
|---|---|
| PATENT NO. | : 11,326,742 B2 |
| APPLICATION NO. | : 16/635138 |
| DATED | : May 10, 2022 |
| INVENTOR(S) | : Yasumasa Yanagida et al. |

It is certified that error appears in the above-identified patent and that said Letters Patent is hereby corrected as shown below:

On the Title Page

Item "(22) PCT Filed" should be changed from:
"February 7, 2018"
To:
-- "July 27, 2018" --

Signed and Sealed this
Second Day of August, 2022

Katherine Kelly Vidal
*Director of the United States Patent and Trademark Office*